(12) United States Patent
Zeng et al.

(10) Patent No.: US 11,095,393 B2
(45) Date of Patent: Aug. 17, 2021

(54) OUTER LOOP LINK ADAPTATION ADJUSTMENT METHOD AND APPARATUS

(71) Applicant: HUAWEI TECHNOLOGIES CO., LTD., Guangdong (CN)

(72) Inventors: Xing Zeng, Shanghai (CN); Yiping Qin, Shanghai (CN)

(73) Assignee: Huawei Technologies Co., Ltd., Guangdong (CN)

(*) Notice: Subject to any disclaimer, the term of this patent is extended or adjusted under 35 U.S.C. 154(b) by 265 days.

(21) Appl. No.: 16/519,198

(22) Filed: Jul. 23, 2019

(65) Prior Publication Data
US 2019/0349789 A1 Nov. 14, 2019

Related U.S. Application Data

(63) Continuation of application No. PCT/CN2017/072676, filed on Jan. 25, 2017.

(51) Int. Cl.
*H04L 1/00* (2006.01)
*H04W 24/02* (2009.01)
(Continued)

(52) U.S. Cl.
CPC .......... *H04L 1/0021* (2013.01); *H04L 1/0003* (2013.01); *H04L 1/0009* (2013.01);
(Continued)

(58) Field of Classification Search
None
See application file for complete search history.

(56) References Cited

U.S. PATENT DOCUMENTS

| 2003/0123406 A1 | 7/2003 | Yavuz et al. |
| 2005/0227698 A1 | 10/2005 | Nonin et al. |

(Continued)

FOREIGN PATENT DOCUMENTS

| CN | 1618250 A | 5/2005 |
| CN | 101170326 A | 4/2008 |

(Continued)

OTHER PUBLICATIONS

Office Action issued in Chinese Application No. 201780076398.9 dated Mar. 18, 2020, 5 pages.

(Continued)

*Primary Examiner* — Ayaz R Sheikh
*Assistant Examiner* — Sori A Aga
(74) *Attorney, Agent, or Firm* — Fish & Richardson P.C.

(57) ABSTRACT

The present disclosure relates to outer loop link adaptation adjustment methods and apparatus. In one example method, a base station obtains at least one piece of channel quality information of a terminal device, determines, based on the at least one piece of channel quality information of the terminal device and channel quality ranges of a plurality of clusters in a cell, a target cluster to which the terminal device belongs, updates a signal to interference plus noise ratio (SINR) error adjustment amount of the target cluster and a channel quality fluctuation parameter of the cell based on the at least one piece of channel quality information of the terminal device, and finally determines an initial value of an outer loop link adaptation (OLLA) adjustment amount of the terminal device based on the SINR error adjustment amount of the target cluster and the channel quality fluctuation parameter of the cell.

18 Claims, 4 Drawing Sheets

(51) Int. Cl.
*H04L 1/20* (2006.01)
*H04L 1/18* (2006.01)
*H04B 17/336* (2015.01)

(52) U.S. Cl.
CPC .......... *H04L 1/0045* (2013.01); *H04L 1/1845* (2013.01); *H04L 1/203* (2013.01); *H04W 24/02* (2013.01); *H04B 17/336* (2015.01)

(56) References Cited

U.S. PATENT DOCUMENTS

| | | |
|---|---|---|
| 2012/0263164 A1 | 10/2012 | Soriaga et al. |
| 2013/0051270 A1 | 2/2013 | Ren |
| 2013/0235835 A1 | 9/2013 | Wang et al. |
| 2018/0035486 A1* | 2/2018 | Mendo Mateo ........ H04W 4/70 |

FOREIGN PATENT DOCUMENTS

| | | |
|---|---|---|
| CN | 101651533 A | 2/2010 |
| CN | 102291765 A | 12/2011 |
| CN | 102347816 A | 2/2012 |
| CN | 102611666 A | 7/2012 |
| CN | 103051430 A | 4/2013 |
| CN | 103250356 A | 8/2013 |
| CN | 103609051 A | 2/2014 |
| EP | 2645786 A1 | 10/2013 |
| EP | 2198549 B1 | 2/2015 |
| EP | 2584711 B1 | 9/2019 |
| KR | 20170005071 A | 1/2017 |
| WO | 2013143069 A1 | 10/2013 |
| WO | 2014205644 A1 | 12/2014 |
| WO | 2015068071 A1 | 5/2015 |

OTHER PUBLICATIONS

Duran et al., "Self-Optimization Algorithm for Outer Loop Link Adaptation in LTE", IEEE Communications Letters, IEEE Service Center, Piscataway, NJ, US, vol. 19, No. 11, XP011589520, Nov. 1, 2015, 4 pages.

Extended European Search Report issued in European Application No. 17894627.3 dated Nov. 22, 2019, 6 pages.

Examination Report issued in Indian Application No. 201937029406 dated Oct. 22, 2020, 6 pages.

PCT International Search Report and Written Opinion issued in International Application No. PCT/CN2017/072676 dated Oct. 20, 2017, 17 pages (with English translation).

R1-121744—Ericsson, ST-Ericsson, "Size of CoMP Measurement Set," 3GPP TSG-RAN WG1 #68bis, Jeju, Korea, Mar. 26-30, 2012, 4 pages.

* cited by examiner

OUTER LOOP LINK ADAPTATION ADJUSTMENT METHOD AND APPARATUS

CROSS-REFERENCE TO RELATED APPLICATIONS

This application is a continuation of International Application No. PCT/CN2017/072676, filed on Jan. 25, 2017, the disclosure of which is hereby incorporated by reference in its entirety.

TECHNICAL FIELD

Embodiments of the present invention relate to communications technologies, and in particular, to an outer loop link adaptation (OLLA) adjustment method and apparatus.

BACKGROUND

An adaptive modulation and coding (AMC) technology is widely used in a wireless transmission system. In the technology, a modulation and coding scheme (MCS) used by a communications system is adjusted to adapt to constantly changing wireless channel quality, thereby improving wireless transmission reliability and a system throughput rate. Specifically, in the technology, a signal to interference plus noise ratio (SINR) of a wireless channel needs to be monitored to measure wireless channel quality, and channel quality at a future moment is predicted based on a measurement result. Finally, an appropriate MCS is selected based on a prediction result by searching for a preset SINR threshold table.

Due to a non-ideal factor in an actual system and a time-varying characteristic of the wireless channel, an irremovable error exists between a predicted SINR and an actually corresponding demodulation and decoding SINR. To reduce impact of an SINR prediction error on system performance, and improve robustness of the entire system, the predicted SINR is usually adjusted through OLLA. During adjustment, an initial SINR adjustment amount (also referred to as an initial OLLA value) needs to be first set, and then a convergence adjustment is made in a small step size, until an initial block error rate (IBLER) of a user meets a target IBLER value. Two errors mainly need to be compensated through OLLA adjustment to obtain the target IBLER value. One error, referred to as a measurement error, is a difference between a measurement SINR (or an SINR threshold) at a current moment and an actual demodulation and decoding SINR. The other error is an SINR fluctuation caused by a time variation or the like of the wireless channel.

In different wireless environments or channel conditions, different error amounts usually need to be compensated. However, an existing initial OLLA value is a fixed initial value, and cannot reflect situations of all wireless environments. Selection of an inappropriate initial OLLA value directly causes longer time required for achieving a convergence state through OLLA adjustment, and consequently system performance is affected. In particular, for a small packet service in a mobile broadband (MBB) service, transmission time of a data service is relatively short, and there is no sufficient data used for OLLA adjustment to implement convergence. Therefore, in an entire transmission process of the small packet service, AMC performance is greatly reduced due to a deviation of an OLLA adjustment amount.

SUMMARY

Embodiments of the present invention provide an outer loop link adaptation adjustment method and apparatus. An initial value of an OLLA adjustment amount of a terminal device is determined from two dimensions: an SINR measurement error and an SINR fluctuation, and a channel quality difference between different terminal devices is considered when the initial value of the OLLA adjustment amount is determined, so that the initial value of the OLLA adjustment amount of the terminal device is more accurate.

A first aspect of the present invention provides an outer loop link adaptation adjustment method, including:

obtaining, by a base station, at least one type of channel quality information of a terminal device;

determining, by the base station based on the at least one type of channel quality information of the terminal device and channel quality ranges of a plurality of clusters in a cell, a target cluster to which the terminal device belongs;

updating, by the base station, a signal to interference plus noise ratio SINR error adjustment amount of the target cluster based on the at least one type of channel quality information of the terminal device;

updating, by the base station, a channel quality fluctuation parameter of the cell based on the at least one type of channel quality information of the terminal device;

if no initial value of an outer loop link adaptation OLLA adjustment amount is set for the terminal device, determining, by the base station, an initial value of the OLLA adjustment amount of the terminal device based on an updated SINR error adjustment amount of the target cluster and an updated channel quality fluctuation parameter of the cell; and based on the initial value of the OLLA adjustment amount of the terminal device, adjusting, by the base station, a measurement SINR of the terminal device, and updating the OLLA adjustment amount of the terminal device, until the OLLA adjustment amount of the terminal device meets a convergence condition.

Optionally, the channel quality information of the terminal device includes the measurement SINR of the terminal device, a reference signal received power RSRP, a cyclic redundancy check CRC result, and an MCS used by the terminal device.

Optionally, the updating, by the base station, an SINR error adjustment amount of the target cluster based on the at least one type of channel quality information of the terminal device is specifically: updating, by the base station, a real block error rate and a hard decision block error rate of the target cluster based on the at least one type of channel quality information of the terminal device; and updating, by the base station, the SINR error adjustment amount of the target cluster based on an updated real block error rate of the target cluster and an updated hard decision block error rate of the target cluster.

Optionally, the updating, by the base station, a real block error rate and a hard decision block error rate of the target cluster based on the at least one type of channel quality information of the terminal device is specifically: obtaining, by the base station, a correction SINR based on a sum of the SINR error adjustment amount of the target cluster and the measurement SINR of the terminal device; obtaining, by the base station based on the MCS used by the terminal device, an SINR threshold corresponding to the MCS used by the terminal device; comparing, by the base station, the correction SINR with the SINR threshold corresponding to the MCS used by the terminal device, to obtain a CRC hard decision result; updating, by the base station, the real block error rate of the target cluster based on the CRC result; and updating, by the base station, the hard decision block error rate of the target cluster based on the CRC hard decision result.

Optionally, the comparing, by the base station, the correction SINR with the SINR threshold corresponding to the MCS used by the terminal device, to obtain a CRC hard decision result is specifically: comparing, by the base station, the correction SINR with the SINR threshold corresponding to the MCS used by the terminal device, where the CRC hard decision result is 0 if the correction SINR is greater than the SINR threshold corresponding to the MCS used by the terminal device, or the CRC hard decision result is 1 if the correction SINR is less than or equal to the SINR threshold corresponding to the MCS used by the terminal device.

Optionally, the updating, by the base station, the real block error rate of the target cluster based on the CRC result includes:

updating, by the base station, the real block error rate of the target cluster according to the following formula:

$$IblerMeas=IblerMeas \times (1-a)+a \times CRC, \text{ where}$$

IblerMeas represents the real block error rate of the target cluster, a represents a filter coefficient, and CRC represents the CRC result; and the updating, by the base station, the hard decision block error rate of the target cluster based on the CRC hard decision result includes:

updating, by the base station, the hard decision block error rate of the target cluster according to the following formula:

$$IblerJudge=IblerJudge \times (1-a)+a \times JudgeCRC, \text{ where}$$

IblerJudge represents the hard decision block error rate of the target cluster, and JudgeCRC represents the CRC hard decision result.

Optionally, the updating, by the base station, the SINR error adjustment amount of the target cluster based on an updated real block error rate of the target cluster and an updated hard decision block error rate of the target cluster is specifically:

updating, by the base station, the SINR error adjustment amount of the target cluster according to the following formula:

$$SinrAdj=SinrAdj+(IblerJudge-IblerMeas) \times AdjStep, \text{ where}$$

SinrAdj is the SINR error adjustment amount of the target cluster, IblerJudge is the updated hard decision block error rate of the target cluster, IblerMeas is the updated real block error rate of the target cluster, and AdjStep is an adjustment step size.

Optionally, the channel quality fluctuation parameter of the cell is an SINR fluctuation variance of the cell, and the updating, by the base station, a channel quality fluctuation parameter of the cell based on the channel quality information of the terminal device is specifically:

updating, by the base station, an average SINR of the cell based on the measurement SINR of the terminal device; and updating, by the base station, the SINR fluctuation variance of the cell according to the following formula:

$$CellSinrVar=CellSinrVar \times (1-a)+a \times (SINR-AvgSinr)^{\wedge}2, \text{ where}$$

CellSinrVar is the SINR fluctuation variance of the cell, SINR is the measurement SINR of the terminal device, AvgSinr is the average SINR of the cell, and a represents a filter coefficient.

Optionally, the determining, by the base station, an initial value of the OLLA adjustment amount of the terminal device based on an updated SINR error adjustment amount of the target cluster and an updated SINR fluctuation variance of the cell includes:

calculating, by the base station, the initial value of the OLLA adjustment amount of the terminal device according to the following formula:

$$ReSinrAdj=SinrAdj-b \times sqrt(CellSinrVar), \text{ where}$$

SinrAdj represents the SINR error adjustment amount of the target cluster, CellSinrVar is the SINR fluctuation variance of the cell, b represents a fluctuation compensation filter coefficient, and sqrt( ) represents a square root extraction operation.

A second aspect of the present invention provides an outer loop link adaptation adjustment apparatus, including:

an obtaining module, configured to obtain at least one type of channel quality information of a terminal device;

a first determining module, configured to determine, based on the at least one type of channel quality information of the terminal device and channel quality ranges of a plurality of clusters in a cell, a target cluster to which the terminal device belongs;

a first update module, configured to update a signal to interference plus noise ratio SINR error adjustment amount of the target cluster based on the at least one type of channel quality information of the terminal device;

a second update module, configured to update a channel quality fluctuation parameter of the cell based on the at least one type of channel quality information of the terminal device;

a second determining module, configured to: if no initial value of an outer loop link adaptation OLLA adjustment amount is set for the terminal device, determine an initial value of the OLLA adjustment amount of the terminal device based on an updated SINR error adjustment amount of the target cluster and an updated channel quality fluctuation parameter of the cell; and an adjustment module, configured to: based on the initial value of the OLLA adjustment amount of the terminal device, adjust a measurement SINR of the terminal device, and update the OLLA adjustment amount of the terminal device, until the OLLA adjustment amount of the terminal device meets a convergence condition.

Optionally, the channel quality information of the terminal device includes the measurement SINR of the terminal device, a reference signal received power RSRP, a cyclic redundancy check CRC result, and an MCS used by the terminal device.

Optionally, the first update module is specifically configured to: update a real block error rate and a hard decision block error rate of the target cluster based on the at least one type of channel quality information of the terminal device, and update the SINR error adjustment amount of the target cluster based on an updated real block error rate of the target cluster and an updated hard decision block error rate of the target cluster.

Optionally, the first update module is specifically configured to:

obtain a correction SINR based on a sum of the SINR error adjustment amount of the target cluster and the measurement SINR of the terminal device;

obtain, based on the MCS used by the terminal device, an SINR threshold corresponding to the MCS used by the terminal device;

compare the correction SINR with the SINR threshold corresponding to the MCS used by the terminal device, to obtain a CRC hard decision result;

update the real block error rate of the target cluster based on the CRC result; and update the hard decision block error rate of the target cluster based on the CRC hard decision result.

Optionally, the first update module is specifically configured to compare the correction SINR with the SINR threshold corresponding to the MCS used by the terminal device, where the CRC hard decision result is 0 if the correction SINR is greater than the SINR threshold corresponding to the MCS used by the terminal device, or the CRC hard decision result is 1 if the correction SINR is less than or equal to the SINR threshold corresponding to the MCS used by the terminal device.

Optionally, the first update module is specifically configured to:

update the real block error rate of the target cluster according to the following formula:

IblerMeas=IblerMeas×(1−$a$)+$a$×CRC, where

IblerMeas represents the real block error rate of the target cluster, a represents a filter coefficient, and CRC represents the CRC result; and update the hard decision block error rate of the target cluster according to the following formula:

IblerJudge=IblerJudge×(1−$a$)+$a$×JudgeCRC, where

IblerJudge represents the hard decision block error rate of the target cluster, and JudgeCRC represents the CRC hard decision result.

Optionally, the first update module is specifically configured to:

update the SINR error adjustment amount of the target cluster according to the following formula:

SinrAdj=SinrAdj+(IblerJudge−IblerMeas)×AdjStep, where

SinrAdj is the SINR error adjustment amount of the target cluster, IblerJudge is the updated hard decision block error rate of the target cluster, IblerMeas is the updated real block error rate of the target cluster, and AdjStep is an adjustment step size.

Optionally, the second update module is specifically configured to:

update an average SINR of the cell based on the measurement SINR of the terminal device; and update an SINR fluctuation variance of the cell according to the following formula:

CellSinrVar=CellSinrVar×(1−$a$)+$a$×(SINR−AvgSinr)^2, where

CellSinrVar is the SINR fluctuation variance of the cell, SINR is the measurement SINR of the terminal device, AvgSinr is the average SINR of the cell, and a represents a filter coefficient.

Optionally, the second determining module is specifically configured to:

calculate the initial value of the OLLA adjustment amount of the terminal device according to the following formula:

ReSinrAdj=SinrAdj−$b$×sqrt(CellSinrVar), where

SinrAdj represents the SINR error adjustment amount of the target cluster, CellSinrVar is the SINR fluctuation variance of the cell, b represents a fluctuation compensation filter coefficient, and sqrt( ) represents a square root extraction operation.

A third aspect of the present invention provides an outer loop link adaptation adjustment apparatus, including a memory and a processor, where the memory is configured to store a program instruction, and the processor is configured to invoke the program instruction in the memory to perform the following method:

obtaining at least one type of channel quality information of a terminal device;

determining, based on the at least one type of channel quality information of the terminal device and channel quality ranges of a plurality of clusters in a cell, a target cluster to which the terminal device belongs;

updating a signal to interference plus noise ratio SINR error adjustment amount of the target cluster based on the at least one type of channel quality information of the terminal device;

updating a channel quality fluctuation parameter of the cell based on the at least one type of channel quality information of the terminal device;

if no initial value of an outer loop link adaptation OLLA adjustment amount is set for the terminal device, determining an initial value of the OLLA adjustment amount of the terminal device based on an updated SINR error adjustment amount of the target cluster and an updated channel quality fluctuation parameter of the cell; and based on the initial value of the OLLA adjustment amount of the terminal device, adjusting a measurement SINR of the terminal device, and updating the OLLA adjustment amount of the terminal device, until the OLLA adjustment amount of the terminal device meets a convergence condition.

Optionally, the channel quality information of the terminal device includes the measurement SINR of the terminal device, a reference signal received power RSRP, a cyclic redundancy check CRC result, and an MCS used by the terminal device.

Optionally, the processor is specifically configured to: update a real block error rate and a hard decision block error rate of the target cluster based on the at least one type of channel quality information of the terminal device, and update the SINR error adjustment amount of the target cluster based on an updated real block error rate of the target cluster and an updated hard decision block error rate of the target cluster.

Optionally, the processor is specifically configured to: obtain a correction SINR based on a sum of the SINR error adjustment amount of the target cluster and the measurement SINR of the terminal device; obtain, based on the MCS used by the terminal device, an SINR threshold corresponding to the MCS used by the terminal device; compare the correction SINR with the SINR threshold corresponding to the MCS used by the terminal device, to obtain a CRC hard decision result; update the real block error rate of the target cluster based on the CRC result; and update the hard decision block error rate of the target cluster based on the CRC hard decision result.

Optionally, the processor is specifically configured to compare the correction SINR with the SINR threshold corresponding to the MCS used by the terminal device, where the CRC hard decision result is 0 if the correction SINR is greater than the SINR threshold corresponding to the MCS used by the terminal device, or the CRC hard decision result is 1 if the correction SINR is less than or equal to the SINR threshold corresponding to the MCS used by the terminal device.

Optionally, the processor is specifically configured to: update the real block error rate of the target cluster according to the following formula:

IblerMeas=IblerMeas×(1−$a$)+$a$×CRC, where

IblerMeas represents the real block error rate of the target cluster, a represents a filter coefficient, and CRC represents the CRC result; and update the hard decision block error rate of the target cluster according to the following formula:

IblerJudge=IblerJudge×(1−$a$)+$a$×JudgeCRC, where

IblerJudge represents the hard decision block error rate of the target cluster, and JudgeCRC represents the CRC hard decision result.

Optionally, the processor is specifically configured to update the SINR error adjustment amount of the target cluster according to the following formula:

SinrAdj=SinrAdj+(IblerJudge−IblerMeas)×AdjStep, where

SinrAdj is the SINR error adjustment amount of the target cluster, IblerJudge is the updated hard decision block error rate of the target cluster, IblerMeas is the updated real block error rate of the target cluster, and AdjStep is an adjustment step size.

Optionally, the processor is specifically configured to: update an average SINR of the cell based on the measurement SINR of the terminal device, and then update an SINR fluctuation variance of the cell according to the following formula: CellSinrVar=CellSinrVar×(1−$a$)+$a$×(SINR−AvgSinr)^2, where CellSinrVar is the SINR fluctuation variance of the cell, SINR is the measurement SINR of the terminal device, AvgSinr is the average SINR of the cell, and a represents a filter coefficient.

Optionally, the processor is specifically configured to calculate the initial value of the OLLA adjustment amount of the terminal device according to the following formula: ReSinrAdj=SinrAdj−b×sqrt(CellSinrVar), where SinrAdj represents the SINR error adjustment amount of the target cluster, CellSinrVar is the SINR fluctuation variance of the cell, b represents a fluctuation compensation filter coefficient, and sqrt( ) represents a square root extraction operation.

According to the outer loop link adaptation adjustment method and apparatus provided in the embodiments of the present invention, the base station obtains the at least one piece of channel quality information of the terminal device, determines, based on the at least one piece of channel quality information of the terminal device and the channel quality ranges of the plurality of clusters in the cell, the target cluster to which the terminal device belongs, updates the SINR error adjustment amount of the target cluster and the channel quality fluctuation parameter of the cell based on the at least one piece of channel quality information of the terminal device, and finally determines the initial value of the OLLA adjustment amount of the terminal device based on the SINR error adjustment amount of the target cluster and the channel quality fluctuation parameter of the cell. In the method in the embodiments, the initial value of the OLLA adjustment amount of the terminal device is determined from two dimensions: an SINR measurement error and an SINR fluctuation, and a channel quality difference between different terminal devices is considered during adjustment, so that the initial value of the OLLA adjustment amount of the terminal device is more accurate.

DESCRIPTION OF EMBODIMENTS

Figure 1:
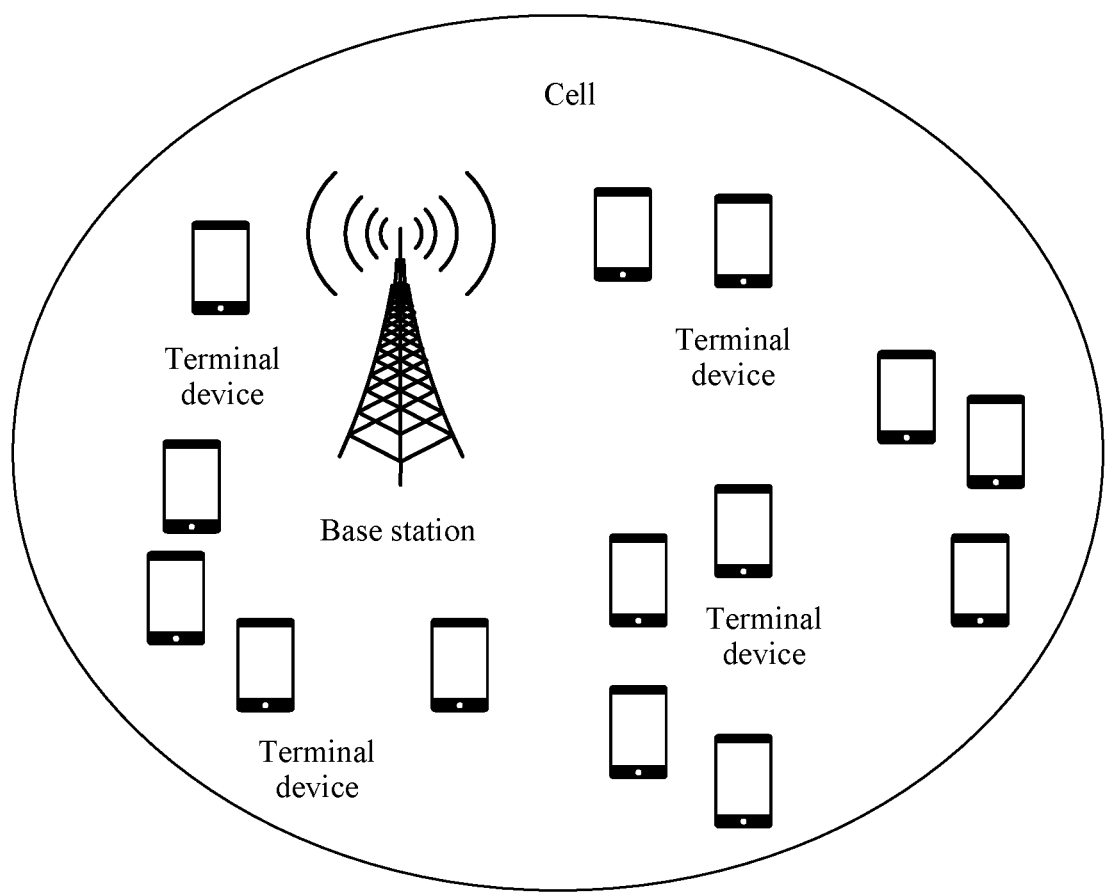
FIG. 1 is a schematic architectural diagram of a communications system to which an embodiment of the present invention is applicable.

Embodiments of the present invention provide a method for determining an outer loop link adaptation initial value, and the method may be applied to an existing communications system. FIG. 1 is a schematic architectural diagram of a communications system to which an embodiment of the present invention is applicable. As shown in FIG. 1, the communications system includes a base station and a plurality of terminal devices. The communications system may be a global system for mobile communications (Global System for Mobile Communications, GSM), a code division multiple access (Code Division Multiple Access, CDMA) system, a wideband code division multiple access (Wideband Code Division Multiple Access, WCDMA) system, a long term evolution (Long Term Evolution, LTE) system, or a 5th generation (5th Generation, 5G) mobile communications system. Correspondingly, the base station may be a base transceiver station (Base Transceiver Station, BTS) in the GSM system or the CDMA system, may be a NodeB (NodeB, NB) in the WCDMA system, may be an evolved NodeB (evolved NodeB, eNB), an access point (AP), or a relay station in the LTE system, or may be a base station in the 5G system. This is not limited herein.

The terminal device may be a wireless terminal. The wireless terminal may refer to a device that provides a user with voice and/or data connectivity, a handheld device with a wireless connection function, or another processing device connected to a wireless modem. The wireless terminal may communicate with at least one core network through a radio access network (RAN). The wireless terminal may be a mobile terminal such as a mobile phone (or referred to as a "cellular" phone) or a computer with a mobile terminal. For example, the wireless terminal may be a portable, pocket-size, handheld, computer built-in or in-vehicle mobile apparatus, which exchanges voice and/or data with the radio access network. The wireless terminal may also be referred to as a subscriber unit, a subscriber station, a mobile station, a mobile console, a remote station, an access point, a remote terminal, an access terminal, a user terminal, user equipment (UE), or a user agent. This is not limited herein.

Figure 2:
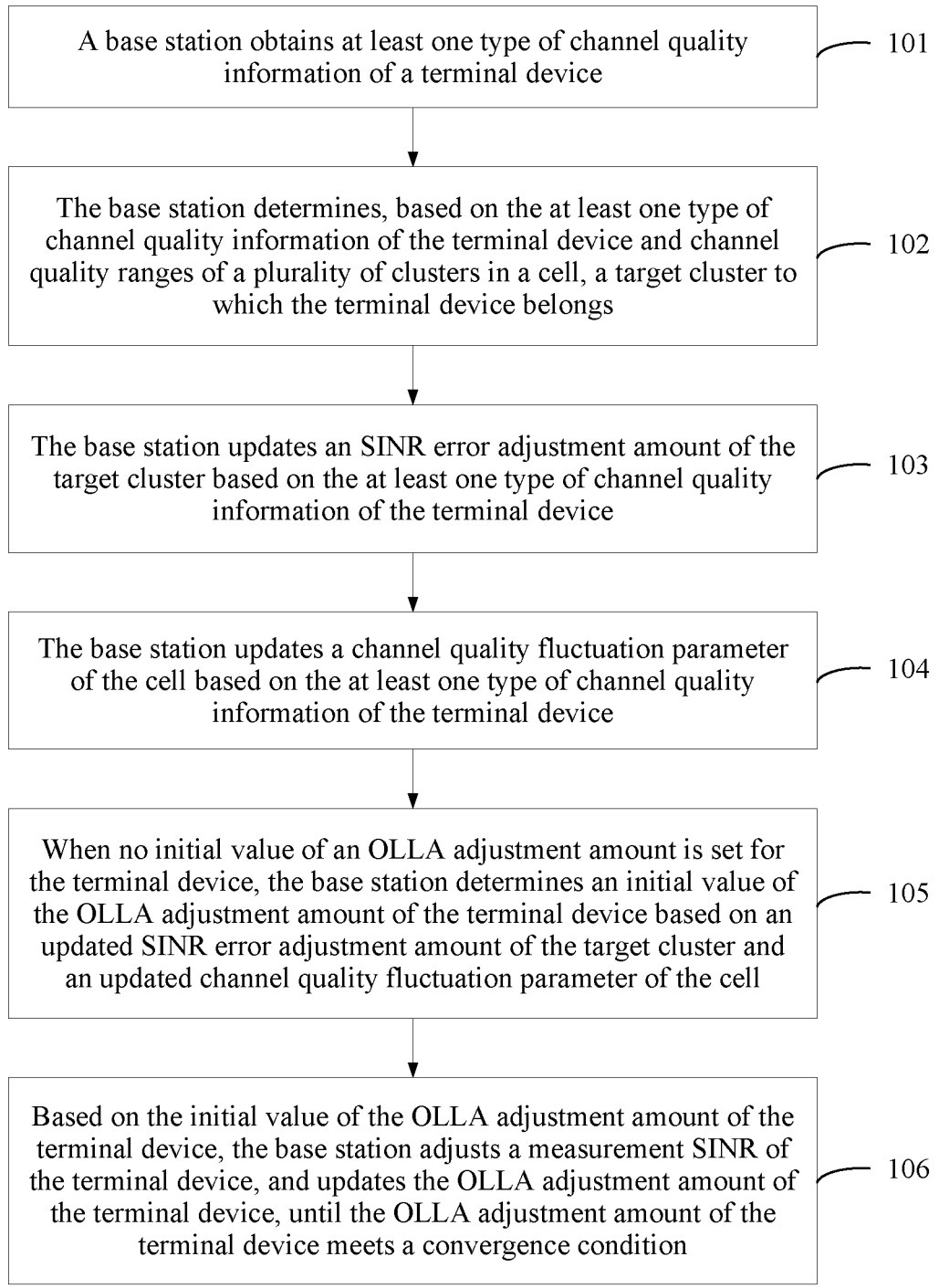
FIG. 2 is a flowchart of an outer loop link adaptation adjustment method according to an embodiment of the present invention.

FIG. 2 is a flowchart of an outer loop link adaptation adjustment method according to an embodiment of the present invention. As shown in FIG. 2, the method provided in this embodiment may include the following steps.

Step 101: A base station obtains at least one type of channel quality information of a terminal device.

The method in this embodiment may be separately applied to uplink transmission and downlink transmission. For the uplink transmission, the base station detects, in real time, all terminal devices that have accessed a cell, to obtain the at least one type of channel quality information of the terminal device. The channel quality information is quality information of an uplink channel. For the downlink transmission, the terminal device detects channel quality information of the terminal device, and reports the detected at least one type of channel quality information to the base station. The channel quality information detected by the terminal device is quality information of a downlink channel. Among the terminal devices that have accessed the cell, some terminal devices transmit data at a current moment, and some terminal devices transmit no data at the current moment. If a terminal device transmits data at the current moment, the base station can obtain channel quality information of the terminal device. If a terminal device transmits no data at the current moment, the base station cannot obtain channel quality information of the terminal device. For a newly accessing terminal device, because the terminal device transmits no data, the base station may perform channel quality measurement in a random access process of the terminal device. In the random access process, the terminal device sends an access preamble (preamble) sequence, and the base station obtains at least one type of channel quality information of the terminal device through measurement.

The terminal device has at least the following four types of channel quality information: a reference signal received power (RSRP), a signal to interference plus noise ratio (SINR), a cyclic redundancy check (CRC) result, and a modulation and coding scheme (MCS) of the terminal device.

The RSRP reflects only absolute received signal strength of the terminal device, and is mainly related to a transmit power spectrum density of the terminal device, a path propagation loss in wireless space, a large/small-scale fading loss, and the like. The SINR reflects a ratio of signal energy to interference plus noise energy. In addition to the foregoing mentioned factors affecting the RSRP, the SINR is further closely related to interference strength in a wireless environment, actual wireless receiver performance, and the like. An MCS is usually selected by using an SINR in an AMC technology. The MCS is mainly determined by using different modulation schemes and bit rates. Common modulation schemes include quadrature phase shift keying (QPSK), 16 quadrature amplitude modulation (QAM), 64 QAM, and the like. Different bit rates can be selected in a same modulation scheme, so that different MCS ranges are formed. For example, in an LTE system, when 64 QAM is supported, there are a total of 29 MCS ranges: 0 to 28, and there are a total of three modulation schemes: QPSK, 16 QAM, and the 64 QAM. In addition, a lower MCS range leads to lower channel quality or a smaller SINR value required for performing correct transmission in a modulation and coding scheme at the range, and a higher MCS range leads to higher channel quality or a larger SINR value required for performing correct transmission in a modulation and coding scheme at the range. Closer MCS ranges lead to closer channel quality or SINR values required for ensuring correct transmission.

At a moment t, the base station may obtain channel quality information of a plurality of terminal devices, or may obtain channel quality information of only one terminal device. When obtaining the channel quality information of the plurality of terminal devices, the base station records a measurement SINR of a terminal device k at the moment t as a measurement SINR (t, k), records a CRC result of the terminal device k at the moment t as a CRC (t, k), and records an MCS used by the terminal device k at the moment t as an MCS (t, k). When the CRC check succeeds, the CRC (t, k)=0. When CRC check fails, the CRC (t, k)=1.

For example, in the uplink transmission, the channel quality information of the terminal device may be obtained by the base station by detecting initially transmitted data of the terminal device, or may be equivalent information obtained by the base station by combining data in a plurality of times of retransmission of the terminal device. After the terminal device initially transmits a data packet, the data packet may fail to be received. The terminal device needs to retransmit the data packet for a plurality of times, until the base station correctly receives the data packet or a quantity of retransmission times reaches a maximum quantity of retransmission times that is set in a system. Then, the terminal device stops sending the data packet. In a retransmission scenario, the base station usually combines a plurality of pieces of received data, and then demodulates and decodes the data, to obtain a combined CRC. Therefore, a single SINR, RSRP, MCS, and the like detected in initial transmission or specific retransmission cannot match the combined CRC. Therefore, channel quality information such as SINRs, RSRPs, and MCSs obtained through measurement in a plurality of times of transmission should be combined to obtain an equivalent SINR, RSRP, and MCS, and the equivalent SINR, RSRP, and MCS match the combined CRC. A specific combination method is not specifically limited in this embodiment, and depends on a specific system. When an effective combination method cannot be obtained, a detection result of the initially transmitted data may be used only. Although the uplink transmission is used as an example for description in the foregoing method, the method is also applicable to the downlink transmission. During the downlink transmission, the terminal device performs CRC combination, and combines channel quality information such as SINRs, RSRPs, and MCSs.

Step 102: The base station determines, based on the at least one type of channel quality information of the terminal device and channel quality ranges of a plurality of clusters in a cell, a target cluster to which the terminal device belongs.

In this embodiment, the cell of the base station includes the plurality of clusters, the plurality of clusters may be obtained through classification by the base station based on the channel quality ranges in advance, and the channel quality ranges of all the clusters are different. It should be specially noted that, as an important measure indicator of channel quality, an SINR is not only related to a channel environment, but also related to performance of a receiver used by a receive end device. Therefore, when receiver types are different or there is a difference in receiver performance, the cell needs to first classify different receivers, and then perform cluster classification for each type of receiver according to the following method. For example, in the uplink transmission, the base station may use a plurality of receiver algorithms, and performance in the plurality of receiver algorithms is different. The base station first performs classification according to the receiver algorithms, and then performs, according to the following method, cluster classification for data of the terminal device that is received by each type of receiver. In the downlink transmission, performance of receivers of terminal devices of different vendors or models may be different. The base station first performs classification based on a difference between the terminal devices, and then performs cluster classification on data of each type of terminal device according to the following method.

Figure 3:
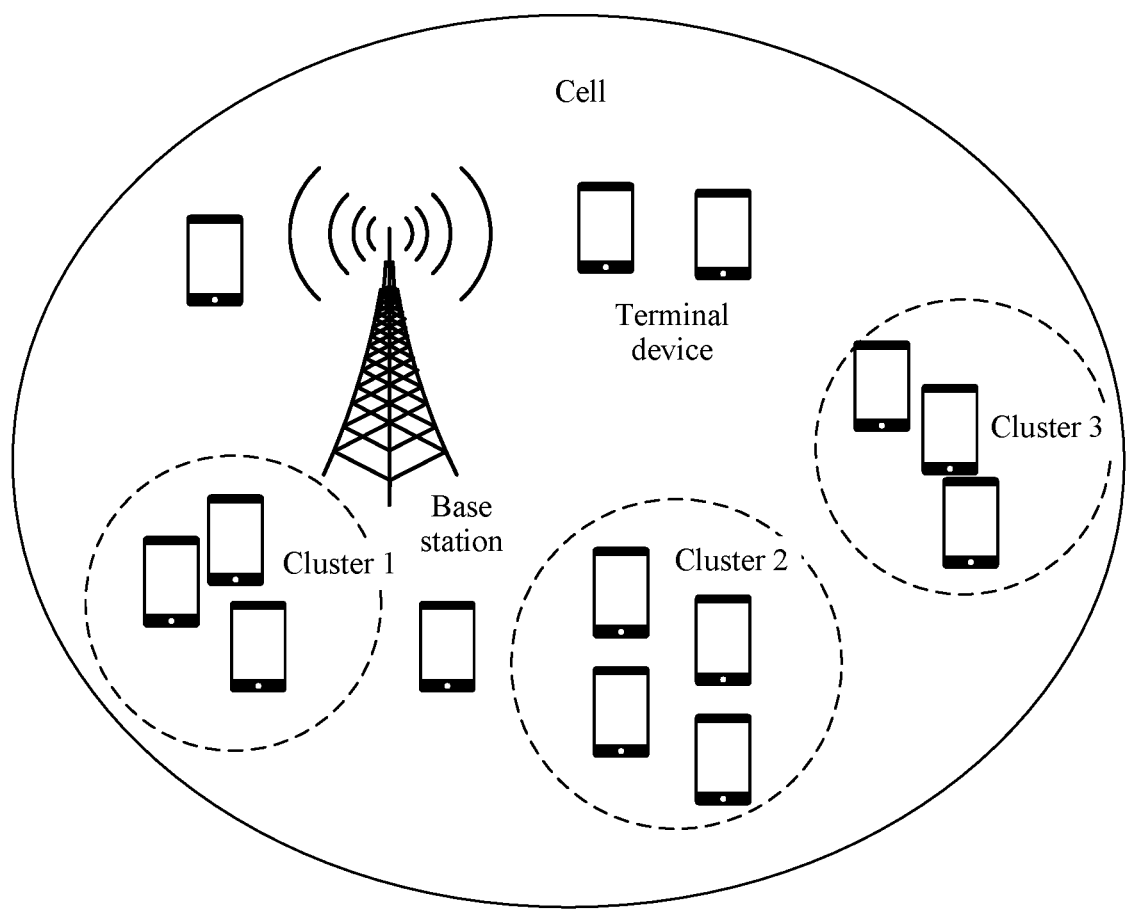
FIG. 3 is a schematic diagram of cluster classification in a cell.

Specifically, the base station may perform cluster classification based on one or more parameters in the channel quality information of the terminal device, for example, an RSRP, a measurement SINR, and an MCS in use. FIG. 3 is a schematic diagram of cluster classification in a cell. As shown in FIG. 3, the cell includes three clusters: a cluster 1, a cluster 2, and a cluster 3. It is assumed that the three clusters are obtained through classification based on an MCS range. For example, in an LTE system, an uplink channel includes a total of 29 MCS ranges: 0 to 28, and the 29 MCS ranges are classified into the three clusters. A channel quality range of the cluster 1 may be MCS ranges 0 to 10, a channel quality range of the cluster 2 may be MCS ranges 11 to 20, and a channel quality range of the cluster 3 may be MCS ranges 21 to 28. FIG. 3 is merely an example for description, and the cell may include more or fewer than three clusters.

When cluster classification is performed based on an SINR, a value range of the SINR is usually −10 dB to 30 dB. A larger value of the SINR indicates better channel quality. Terminal devices in the cell may be classified into five clusters based on the SINR. A channel quality range of a cluster 1 may be SINRs less than 3, a channel quality range of a cluster 2 may be SINRs ranging from 3 to 10, a channel quality range of a cluster 3 may be SINRs ranging from 11 to 15, a channel quality range of a cluster 4 may be SINRs ranging from 16 to 25, and a channel quality range of a cluster 5 may be SINRs greater than 25.

When cluster classification is performed based on an RSRP, a value range of the RSRP is usually −140 dbm to −40 dbm. A larger value of the RSRP indicates better channel quality. Terminal devices in the cell may be classified into five clusters based on the RSRP. A channel quality range of a cluster 1 may be RSRPs less than −115 dbm, a channel quality range of a cluster 2 may be RSRPs ranging from −115 dbm to −105 dbm, a channel quality range of a cluster 3 may be RSRPs ranging from −105 dbm to −95 dbm, a channel quality range of a cluster 4 may be RSRPs ranging from −95 dbm to −85 dbm, and a channel quality range of a cluster 5 may be RSRPs greater than −85 dbm.

If the base station obtains only one type of channel quality information in step 101, the base station can determine, based on only the one type of channel quality information obtained in step 101, the target cluster to which the terminal device belongs. If the base station obtains a plurality of types of channel quality information in step 101, the base station may determine, based on one or more of the plurality of types of channel quality information, the target cluster to which the terminal device belongs. Specifically, when cluster classification is performed based on an RSRP, the base station determines whether the measurement RSRP of the terminal device belongs to an RSRP range corresponding to each cluster, and when the measurement RSRP of the terminal device belongs to an RSRP range corresponding to a cluster, the base station determines that the cluster is the target cluster to which the terminal device belongs. When cluster classification is performed based on an MCS, the base station determines whether the MCS used by the terminal device belongs to an MCS range corresponding to each cluster, and when the MCS used by the terminal device belongs to an MCS range corresponding to a cluster, the base station determines that the cluster is the target cluster to which the terminal device belongs. When cluster classification is performed based on an SINR, the base station determines whether the measurement SINR of the terminal device belongs to an SINR range corresponding to each cluster, and when the measurement SINR of the terminal device belongs to an SINR range corresponding to a cluster, the base station determines that the cluster is the target cluster to which the terminal device belongs. Alternatively, classification is performed by making a comprehensive decision based on a plurality of groups of range thresholds for a plurality of measurement quantities.

In this embodiment, the base station performs cluster classification on the terminal device based on the at least one type of channel quality information of the terminal device. Information with similar characteristics may be classified into a same cluster, and terminal devices in a same cluster have similar measurement SINR errors. It should be specially noted that, due to mobility of the terminal device, switching between different receiver methods, or the like, behavior such as cell handover or a channel quality characteristic change in a same cell may occur on a same terminal device. Therefore, a cluster to which each terminal device belongs is determined based on a current measurement result. Overall, a same terminal device may belong to different clusters at different moments. In other words, terminal devices in each cluster all change dynamically.

Step 103: The base station updates an SINR error adjustment amount of the target cluster based on the at least one type of channel quality information of the terminal device.

In this embodiment, the base station needs to maintain an SINR error adjustment amount for each cluster, and maintain a channel quality fluctuation parameter of the cell. The SINR error adjustment amount is mainly used to compensate for an SINR measurement error. The channel quality fluctuation parameter of the cell is mainly used to compensate for an SINR fluctuation caused by a time variation of a wireless channel, or the like. An initial value of the SINR error adjustment amount of each cluster is a fixed value preconfigured for the base station. Initial values of SINR error adjustment amounts of all clusters may be the same or may be different. Subsequently, the SINR error adjustment amount of each cluster is updated based on channel quality information of a terminal device in the cluster. If an initial value of an SINR error adjustment amount of a cluster 1 is A, and channel quality information of three terminal devices is detected at the moment t, the base station first updates the SINR error adjustment amount from the initial value A to A+Δ1 based on channel quality information of a terminal device 1, then updates the SINR error adjustment amount from A+Δ1 to A+Δ1+Δ2 based on channel quality information of a terminal device 2, and subsequently updates the SINR error adjustment amount from A+Δ1+Δ2 to A+Δ1+Δ2+Δ3 based on channel quality information of a terminal device 3, where each of values of Δ1, Δ2 and Δ3 may be a positive number, 0, or a negative number.

Specifically, the base station may first update a real block error rate and a hard decision block error rate of the target cluster based on the at least one type of channel quality information of the terminal device, and then update the SINR error adjustment amount of the target cluster based on an updated real block error rate of the target cluster and an updated hard decision block error rate of the target cluster, to eliminate a measurement error. If the base station obtains only one type of channel quality information in step 101, the base station can update the real block error rate and the hard decision block error rate of the target cluster based on only the one type of channel quality information obtained in step 101. If the base station obtains a plurality of types of channel quality information in step 101, the base station may update the real block error rate and the hard decision block error rate of the target cluster based on one or more of the plurality of types of channel quality information.

In the following example, the base station updates the real block error rate and the hard decision block error rate of the target cluster based on a measurement SINR of the terminal device, a CRC result, and an MCS used by the terminal device. Details are as follows:

(1) The base station obtains a correction SINR based on a sum of the SINR error adjustment amount of the target cluster and the measurement SINR of the terminal device, in other words, CorrSINR (t, k)=SINR (t, k)+SinrAdj, where CorrSINR (t, k) represents the correction SINR, SINR (t, k) represents the measurement SINR of the terminal device k at the moment t, and SinrAdj represents the SINR error adjustment amount of the target cluster.

(2) The base station obtains, based on the MCS used by the terminal device, an SINR threshold corresponding to the MCS used by the terminal device. SINR thresholds corresponding to all MCSs may be preconfigured by a system into a corresponding threshold table. Subsequently, the base station queries the threshold table based on an MCS used by the terminal device k, to obtain an SINR threshold corresponding to the MCS used by the terminal device k, and records the SINR threshold corresponding to the MCS used by the terminal device k as ThrSINR (t, k).

(3) The base station compares the correction SINR with the SINR threshold corresponding to the MCS used by the terminal device, to obtain a CRC hard decision result.

Specifically, the base station compares the correction SINR with the SINR threshold corresponding to the MCS used by the terminal device. When the correction SINR is greater than the SINR threshold corresponding to the MCS used by the terminal device, the CRC hard decision result is 0. If the CRC hard decision result is recorded as JudgeCRC (t, k), JudgeCRC (t, k)=0. When the correction SINR is less than or equal to the SINR threshold corresponding to the MCS used by the terminal device, the CRC hard decision result is 1, in other words, JudgeCRC (t, k)=1. If the CRC hard decision result is 0, it indicates that corrected channel quality is better than channel quality before correction. If the CRC hard decision result is 1, it indicates that corrected channel quality is worse than channel quality before correction.

(4) The base station updates the real block error rate of the target cluster based on the CRC result of the terminal device, and updates the hard decision block error rate of the target cluster based on the CRC hard decision result.

Specifically, the base station updates the real block error rate of the target cluster according to the following formula:

IblerMeas=IblerMeas×(1−a)+a×CRC(t,k), where

IblerMeas represents the real block error rate of the target cluster, a represents a filter coefficient, a value of a may be adjusted to obtain good performance in different systems or scenarios, CRC (t, k) represents a CRC result of the newly accessing terminal device k at the moment t, and the CRC result is obtained by the base station by performing decoding based on an actually received result.

The base station updates the hard decision block error rate of the target cluster according to the following formula:

IblerJudge=IblerJudge×(1−a)+a×JudgeCRC(t,k), where

IblerJudge represents the hard decision block error rate of the target cluster, and JudgeCRC (t, k) represents a CRC hard decision result of the terminal device k at the moment t.

The base station may specifically update the SINR error adjustment amount of the target cluster based on the updated real block error rate of the target cluster and the updated hard decision block error rate of the target cluster according to the following formula:

SinrAdj=SinrAdj+(IblerJudge−IblerMeas)×AdjStep, where

SinrAdj is the SINR error adjustment amount of the target cluster, IblerJudge is the hard decision block error rate of the target cluster, IblerMeas is the real block error rate of the target cluster, and AdjStep is an adjustment step size. AdjStep is mainly used to weigh tracking, a convergence speed, and stability of an adjustment algorithm. For different systems and scenarios, AdjStep may be adjusted based on a requirement, to select optimal AdjStep.

Step 104: The base station updates a channel quality fluctuation parameter of the cell based on the at least one type of channel quality information of the terminal device.

The channel quality fluctuation parameter of the cell is mainly used to compensate for an SINR fluctuation caused by a time variation of a wireless channel, or the like. The SINR fluctuation is usually related to a wireless channel physical environment (including large/small-scale fading and the like), a change of co-channel interference caused by a neighboring cell on a serving cell, and the like. In an actual wireless network, a cell always serves terminal devices in a fixed physical area, and the terminal devices in the cell have similar wireless channel physical environments. Due to randomness of terminal device behavior in the entire wireless network, a pattern of wireless interference on a terminal device also tends to be random. Therefore, in a same cell, SINR fluctuations (which usually refer to SINR values obtained after a correlation of an SINR is filtered out through temporal filtering) of a terminal device have similar statistical characteristics. Therefore, in this embodiment, the base station collects real-time statistics of a channel quality fluctuation parameter generated by each terminal device in the cell, and obtains the channel quality fluctuation parameter of the cell based on the channel quality fluctuation parameter generated by each terminal device. When a terminal device newly accesses the cell, the base station may use the channel quality fluctuation parameter of the cell as a reference of a channel quality fluctuation status of the terminal device.

The channel quality fluctuation parameter of the cell includes one or more of the following parameters: an SINR fluctuation variance, an interference intensity change amount, a Doppler frequency shift value, and a moving speed and a physical environment of the terminal device. For example, the physical environment is a dense urban area or an open suburb.

Optionally, when behavior of terminal devices in a cell is not random, but has some fixed differences, referring to an idea of processing an SINR error adjustment amount based on cluster classification, an SINR fluctuation variance may also be processed based on cluster classification. Details are not described herein.

In this embodiment, when the channel quality fluctuation parameter of the cell is the SINR fluctuation variance of the cell, the base station updates the SINR fluctuation variance of the cell based on the channel quality information of the terminal device. Details are as follows:

The base station first updates an average SINR of the cell based on the measurement SINR of the terminal device. The measurement SINR is usually an instantaneous measurement value. The base station may obtain the average SINR of the cell by performing temporal filtering on the measurement SINR. Then, the base station updates the SINR fluctuation variance of the cell according to the following formula:

CellSinrVar=CellSinrVar×(1−a)+a×(SINR(t,k)−AvgSinr)^2, where

CellSinrVar is the SINR fluctuation variance of the cell, SINR (t, k) is the measurement SINR of the terminal device k at the moment t, AvgSinr is the average SINR of the cell, and a represents a filter coefficient that may be adjusted based on an actual situation.

Step 105: When no initial value of an OLLA adjustment amount is set for the terminal device, the base station determines an initial value of the OLLA adjustment amount of the terminal device based on an updated SINR error adjustment amount of the target cluster and an updated channel quality fluctuation parameter of the cell.

After step 104, the base station needs to determine whether the initial value of the OLLA adjustment amount is set for the terminal device. If the base station sets no initial value of the OLLA adjustment amount for the terminal device, step 105 is performed, or if the base station has set the initial value of the OLLA adjustment amount for the terminal device, step 106 is directly performed after step 104.

Specifically, the base station may calculate the initial value of the OLLA adjustment amount of the terminal device according to the following formula:

ReSinrAdj=SinrAdj−b×sqrt(CellSinrVar), where

SinrAdj represents the SINR error adjustment amount that is of the target cluster and that is obtained in step 103, CellSinrVar is the SINR fluctuation variance that is of the cell and that is obtained in step 104, b represents a fluctuation compensation filter coefficient, and sqrt( ) represents a square root extraction operation. A value of b may be adjusted based on different requirements. For example, in an LTE system, an IBLER of a data service transmitted on a PUSCH needs to be less than 10%, and if an SINR fluctuation is approximately Gaussian distribution, b is set to 1.23.

It can be learned from the foregoing formula that, in the method in this embodiment, the measurement SINR of the terminal device is compensated from two dimensions: the SINR measurement error and the SINR fluctuation, and a channel quality difference between different terminal devices is considered during compensation, so that the initial value of the OLLA adjustment amount of the terminal device is more accurate. Finally, all terminal devices in the cell can obtain optimal initial values of OLLA adjustment amounts.

Theoretically, each terminal device has an optimal initial value of an OLLA adjustment amount, and in most scenarios, initial values of OLLA adjustment amounts of all terminal devices are different. To obtain the optimal initial value of the OLLA adjustment amount, each terminal device requires sufficient data samples for convergence of the initial values of the OLLA adjustment amounts. If no cluster classification is performed on the terminal devices in the cell, convergence of the initial values of the OLLA adjustment amounts may be performed by using data samples of all the terminal devices. In this method, although there are sufficient data samples for convergence of the initial values of the OLLA adjustment amounts, a finally obtained initial value of the OLLA adjustment amount is an average statistical result of all the terminal devices, and there is still a large difference between the average statistical result and the optimal initial value of the OLLA adjustment amount of each terminal device. In the method in this embodiment, terminal devices with similar optimal initial values of OLLA adjustment amounts are classified into one cluster by using a cluster classification method, so that a relatively small difference can be ensured between an optimal initial value of an OLLA adjustment amount of an individual terminal device and a statistical initial value of an OLLA adjustment amount in the cluster, and sufficient data samples in each cluster can also be ensured to implement convergence of initial values of OLLA adjustment amounts.

Step 106: Based on the initial value of the OLLA adjustment amount of the terminal device, the base station adjusts a measurement SINR of the terminal device, and updates the OLLA adjustment amount of the terminal device, until the OLLA adjustment amount of the terminal device meets a convergence condition.

In a data transmission process of the terminal device, the base station obtains a measurement SINR of the terminal device in a current transmission time unit. The transmission time unit may be a minimum transmission unit in an existing communications system, for example, a transmission time interval (TTI) in an LTE system. With development of the communications system, the transmission time unit may change.

When the measurement SINR is adjusted for the first time, the base station adds the measurement SINR of the terminal device to the initial value of the OLLA adjustment amount of the terminal device to obtain an adjusted SINR, and then selects, based on the preset SINR threshold table, an MCS corresponding to the adjusted SINR. The MCS corresponding to the adjusted SINR is an MCS used by the terminal device in a next transmission time unit. The convergence condition may be a target IBLER value. For example, the target value is 10%. Then, in the next transmission time unit, the terminal device transmits data by using the MCS corresponding to the adjusted SINR. The base station measures an IBLER of the terminal device, and compares an IBLER obtained through measurement with the target IBLER value. If the IBLER obtained through measurement is less than the target IBLER value, it is determined that the OLLA adjustment amount meets the convergence condition, and adjustment of the OLLA adjustment amount ends. If the IBLER obtained through measurement is greater than the target IBLER value, it is determined that the OLLA adjustment amount does not meet the convergence condition, and the base station updates the OLLA adjustment amount by using a preset adjustment step size. After the OLLA adjustment amount is updated, the measurement SINR of the terminal device is adjusted by using an updated OLLA adjustment amount, and the foregoing process is repeated, until an updated OLLA adjustment amount meets the convergence condition. Then, it is determined that the OLLA adjustment amount is an OLLA adjustment amount used by the terminal device.

In this embodiment, the base station obtains the at least one piece of channel quality information of the terminal device, determines, based on the at least one piece of channel quality information of the terminal device and the channel quality ranges of the plurality of clusters in the cell, the target cluster to which the terminal device belongs, updates the SINR error adjustment amount of the target cluster and the channel quality fluctuation parameter of the cell based on the at least one piece of channel quality information of the terminal device, and finally determines the initial value of the OLLA adjustment amount of the terminal device based on the SINR error adjustment amount of the target cluster and the channel quality fluctuation parameter of the cell. In the method in this embodiment, the initial value of the OLLA adjustment amount of the terminal device is determined from two dimensions: the SINR measurement error and the SINR fluctuation, and a channel quality difference between different terminal devices is considered during adjustment, so that the initial value of the OLLA adjustment amount of the terminal device is more accurate.

Figure 4:
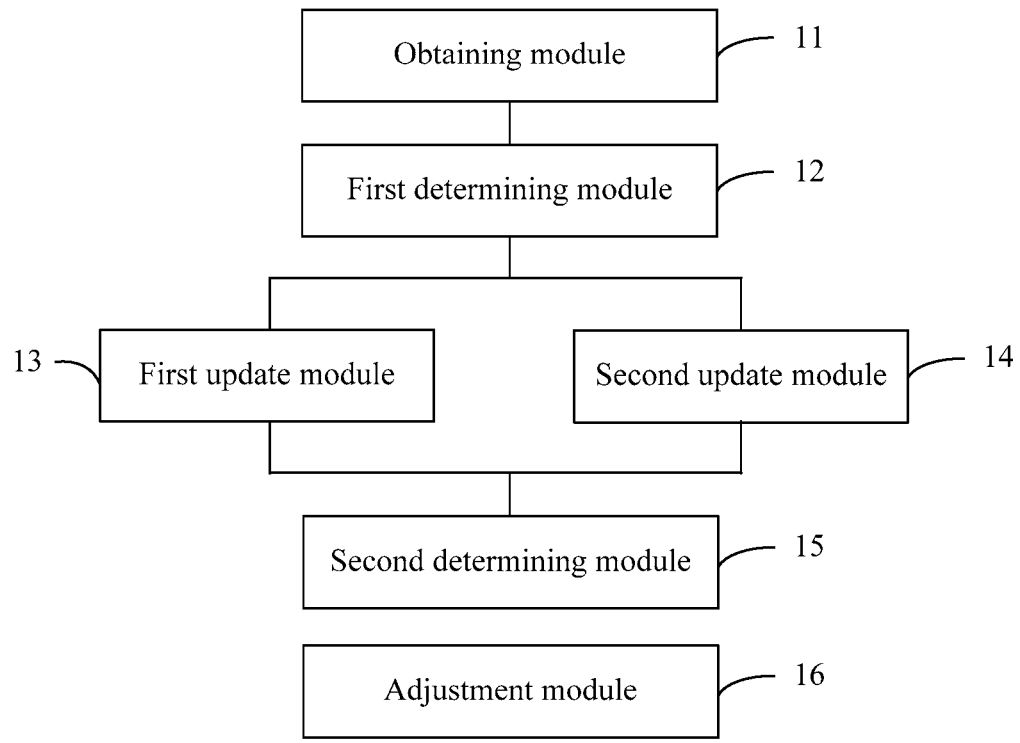
FIG. 4 is a schematic structural diagram of an outer loop link adaptation adjustment apparatus according to an embodiment of the present invention.

FIG. 4 is a schematic structural diagram of an outer loop link adaptation adjustment apparatus according to an embodiment of the present invention. As shown in FIG. 4, the apparatus includes:

an obtaining module 11, configured to obtain at least one type of channel quality information of a terminal device;

a first determining module 12, configured to determine, based on the at least one type of channel quality information of the terminal device and channel quality ranges of a plurality of clusters in a cell, a target cluster to which the terminal device belongs;

a first update module 13, configured to update a signal to interference plus noise ratio SINR error adjustment amount of the target cluster based on the at least one type of channel quality information of the terminal device;

a second update module 14, further configured to update a channel quality fluctuation parameter of the cell based on the at least one type of channel quality information of the terminal device;

a second determining module 15, configured to: if no initial value of an OLLA adjustment amount is set for the terminal device, determine an initial value of the OLLA adjustment amount of the terminal device based on an updated SINR error adjustment amount of the target cluster and an updated channel quality fluctuation parameter of the cell; and an adjustment module 16, configured to: based on the initial value of the OLLA adjustment amount of the terminal device, adjust a measurement SINR of the terminal device, and update the OLLA adjustment amount of the terminal device, until the OLLA adjustment amount of the terminal device meets a convergence condition.

Optionally, the channel quality information of the terminal device includes the measurement SINR of the terminal device, an RSRP, a CRC result, and an MCS used by the terminal device.

Optionally, the first update module 13 is specifically configured to: update a real block error rate and a hard decision block error rate of the target cluster based on the at least one type of channel quality information of the terminal device, and update the SINR error adjustment amount of the target cluster based on an updated real block error rate of the target cluster and an updated hard decision block error rate of the target cluster.

Optionally, the first update module 13 is specifically configured to: obtain a correction SINR based on a sum of the SINR error adjustment amount of the target cluster and the measurement SINR of the terminal device; obtain, based on the MCS used by the terminal device, an SINR threshold corresponding to the MCS used by the terminal device; compare the correction SINR with the SINR threshold corresponding to the MCS used by the terminal device, to obtain a CRC hard decision result; update the real block error rate of the target cluster based on the CRC result; and update the hard decision block error rate of the target cluster based on the CRC hard decision result.

Optionally, the first update module 13 is specifically configured to compare the correction SINR with the SINR threshold corresponding to the MCS used by the terminal device, where the CRC hard decision result is 0 if the correction SINR is greater than the SINR threshold corresponding to the MCS used by the terminal device, or the CRC hard decision result is 1 if the correction SINR is less than or equal to the SINR threshold corresponding to the MCS used by the terminal device.

Optionally, the first update module 13 is specifically configured to: update the real block error rate of the target cluster according to the following formula: IblerMeas=IblerMeas×(1−a)+a×CRC, where IblerMeas represents the real block error rate of the target cluster, a represents a filter coefficient, and CRC represents the CRC result; and update the hard decision block error rate of the target cluster according to the following formula: IblerJudge=IblerJudge×(1−a)+a×JudgeCRC, where IblerJudge represents the hard decision block error rate of the target cluster, and JudgeCRC represents the CRC hard decision result.

Optionally, the first update module 13 is specifically configured to update the SINR error adjustment amount of the target cluster according to the following formula: SinrAdj=SinrAdj+(IblerJudge−IblerMeas)×AdjStep, where SinrAdj is the SINR error adjustment amount of the target cluster, IblerJudge is the updated hard decision block error rate of the target cluster, IblerMeas is the updated real block error rate of the target cluster, and AdjStep is an adjustment step size.

Optionally, the second update module 14 is specifically configured to: update an average SINR of the cell based on the measurement SINR of the terminal device, and update an SINR fluctuation variance of the cell according to the following formula: CellSinrVar=CellSinrVar×(1−a)+a×(SINR−AvgSinr)^2, where CellSinrVar is the SINR fluctuation variance of the cell, SINR is the measurement SINR of the terminal device, AvgSinr is the average SINR of the cell, and a represents a filter coefficient.

Optionally, the second determining module 15 is specifically configured to calculate the initial value of the OLLA adjustment amount of the terminal device according to the following formula: ReSinrAdj=SinrAdj−b×sqrt(CellSinrVar), where SinrAdj represents the SINR error adjustment amount of the target cluster, CellSinrVar is the SINR fluctuation variance of the cell, b represents a fluctuation compensation filter coefficient, and sqrt( ) represents a square root extraction operation.

An implementation principle and a technical effect of the apparatus provided in this embodiment are similar to those in the foregoing method embodiment, and details are not described herein again.

Figure 5:
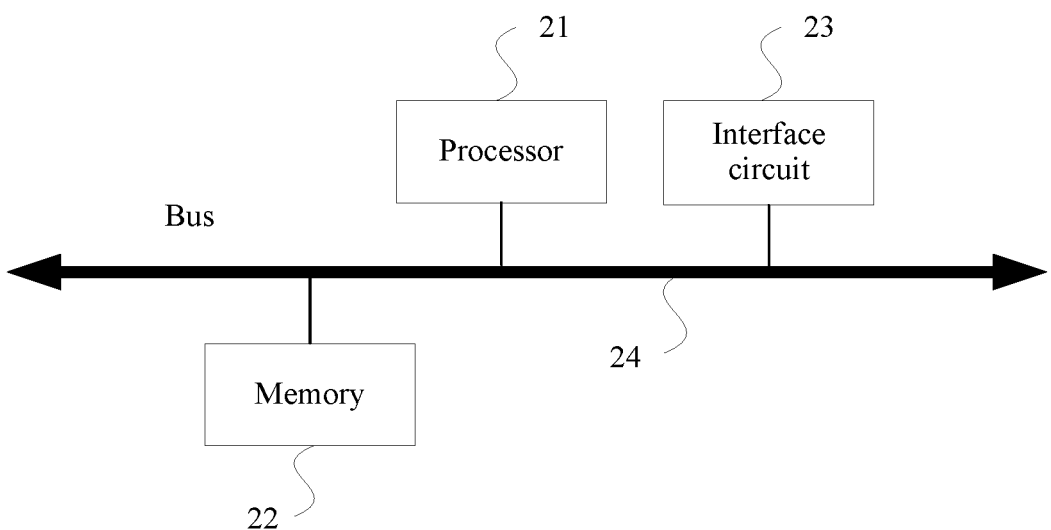
FIG. 5 is a schematic structural diagram of another outer loop link adaptation adjustment apparatus according to an embodiment of the present invention.

FIG. 5 is a schematic structural diagram of another outer loop link adaptation adjustment apparatus according to an embodiment of the present invention. As shown in FIG. 5, the apparatus includes a processor 21, a memory 22, an interface circuit 23, and a bus 24.

The processor 21, the memory 22, and the interface circuit 23 are connected and complete mutual communication by using the bus 24, and the processor 21 interacts with another apparatus by using the interface circuit 23. The memory 22 stores a group of program code, and the processor 21 invokes the program code stored in the memory 22, to perform the following operations:

obtaining at least one type of channel quality information of a terminal device;

determining, based on the at least one type of channel quality information of the terminal device and channel quality ranges of a plurality of clusters in a cell, a target cluster to which the terminal device belongs;

updating a signal to interference plus noise ratio SINR error adjustment amount of the target cluster based on the at least one type of channel quality information of the terminal device;

updating a channel quality fluctuation parameter of the cell based on the at least one type of channel quality information of the terminal device;

if no initial value of an outer loop link adaptation OLLA adjustment amount is set for the terminal device, determining an initial value of the OLLA adjustment amount of the terminal device based on an updated SINR error adjustment amount of the target cluster and an updated channel quality fluctuation parameter of the cell; and based on the initial value of the OLLA adjustment amount of the terminal device, adjusting a measurement SINR of the terminal device, and updating the OLLA adjustment amount of the terminal device, until the OLLA adjustment amount of the terminal device meets a convergence condition.

Optionally, the channel quality information of the terminal device includes the measurement SINR of the terminal device, a reference signal received power RSRP, a cyclic redundancy check CRC result, and an MCS used by the terminal device.

Optionally, the processor 21 is specifically configured to: update a real block error rate and a hard decision block error rate of the target cluster based on the at least one type of channel quality information of the terminal device, and update the SINR error adjustment amount of the target cluster based on an updated real block error rate of the target cluster and an updated hard decision block error rate of the target cluster.

Optionally, the processor 21 is specifically configured to: obtain a correction SINR based on a sum of the SINR error adjustment amount of the target cluster and the measurement SINR of the terminal device; obtain, based on the MCS used by the terminal device, an SINR threshold corresponding to the MCS used by the terminal device; compare the correction SINR with the SINR threshold corresponding to the MCS used by the terminal device, to obtain a CRC hard decision result; update the real block error rate of the target cluster based on the CRC result; and update the hard decision block error rate of the target cluster based on the CRC hard decision result.

Optionally, the processor 21 is specifically configured to compare the correction SINR with the SINR threshold corresponding to the MCS used by the terminal device, where the CRC hard decision result is 0 if the correction SINR is greater than the SINR threshold corresponding to the MCS used by the terminal device, or the CRC hard decision result is 1 if the correction SINR is less than or equal to the SINR threshold corresponding to the MCS used by the terminal device.

Optionally, the processor 21 is specifically configured to: update the real block error rate of the target cluster according to the following formula:

$IblerMeas = IblerMeas \times (1-a) + a \times CRC$, where

IblerMeas represents the real block error rate of the target cluster, a represents a filter coefficient, and CRC represents the CRC result; and update the hard decision block error rate of the target cluster according to the following formula:

$IblerJudge = IblerJudge \times (1-a) + a \times JudgeCRC$, where

IblerJudge represents the hard decision block error rate of the target cluster, and JudgeCRC represents the CRC hard decision result.

Optionally, the processor is specifically configured to update the SINR error adjustment amount of the target cluster according to the following formula:

$SinrAdj = SinrAdj + (IblerJudge - IblerMeas) \times AdjStep$, where

SinrAdj is the SINR error adjustment amount of the target cluster, IblerJudge is the updated hard decision block error rate of the target cluster, IblerMeas is the updated real block error rate of the target cluster, and AdjStep is an adjustment step size.

Optionally, the processor 21 is specifically configured to: update an average SINR of the cell based on the measurement SINR of the terminal device, and then update an SINR fluctuation variance of the cell according to the following formula: $CellSinrVar = CellSinrVar \times (1-a) + a \times (SINR - AvgSinr)^2$, where CellSinrVar is the SINR fluctuation variance of the cell, SINR is the measurement SINR of the terminal device, AvgSinr is the average SINR of the cell, and a represents a filter coefficient.

Optionally, the processor 21 is specifically configured to calculate the initial value of the OLLA adjustment amount of the terminal device according to the following formula: $ReSinrAdj = SinrAdj - b \times sqrt(CellSinrVar)$, where SinrAdj represents the SINR error adjustment amount of the target cluster, CellSinrVar is the SINR fluctuation variance of the cell, b represents a fluctuation compensation filter coefficient, and sqrt( ) represents a square root extraction operation.

An implementation principle and a technical effect of the apparatus provided in this embodiment are similar to those in the foregoing method embodiment, and details are not described herein again.

In the several embodiments provided in the present invention, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) or a processor (English: processor) to perform some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

What is claimed is:

1. An outer loop link adaptation adjustment method, comprising:
   obtaining, by a base station, at least one type of channel quality information of a terminal device;
   determining, by the base station and based on the at least one type of channel quality information of the terminal device and channel quality ranges of a plurality of clusters in a cell, a target cluster to which the terminal device belongs;
   updating, by the base station, a signal to interference plus noise ratio (SINR) error adjustment amount of the target cluster based on the at least one type of channel quality information of the terminal device;
   updating, by the base station, a channel quality fluctuation parameter of the cell based on the at least one type of channel quality information of the terminal device;
   if no initial value of an outer loop link adaptation (OLLA) adjustment amount is set for the terminal device, determining, by the base station, an initial value of the OLLA adjustment amount of the terminal device based on an updated SINR error adjustment amount of the target cluster and an updated channel quality fluctuation parameter of the cell; and
   based on the initial value of the OLLA adjustment amount of the terminal device, adjusting, by the base station, a measurement SINR of the terminal device, and updating the OLLA adjustment amount of the terminal device until the OLLA adjustment amount of the terminal device meets a convergence condition.

2. The method according to claim 1, wherein the channel quality information of the terminal device comprises the measurement SINR of the terminal device, a reference signal received power (RSRP), a cyclic redundancy check (CRC) result, and a modulation and coding scheme (MCS) used by the terminal device.

3. The method according to claim 2, wherein the updating, by the base station, an SINR error adjustment amount of the target cluster based on the at least one type of channel quality information of the terminal device comprises:
   updating, by the base station, a real block error rate and a hard decision block error rate of the target cluster based on the at least one type of channel quality information of the terminal device; and
   updating, by the base station, the SINR error adjustment amount of the target cluster based on an updated real block error rate of the target cluster and an updated hard decision block error rate of the target cluster.

4. The method according to claim 3, wherein the updating, by the base station, a real block error rate and a hard decision block error rate of the target cluster based on the at least one type of channel quality information of the terminal device comprises:
   obtaining, by the base station, a correction SINR based on a sum of the SINR error adjustment amount of the target cluster and the measurement SINR of the terminal device;
   obtaining, by the base station and based on the MCS used by the terminal device, an SINR threshold corresponding to the MCS used by the terminal device;
   comparing, by the base station, the correction SINR with the SINR threshold corresponding to the MCS used by the terminal device to obtain a CRC hard decision result;
   updating, by the base station, the real block error rate of the target cluster based on the CRC result; and
   updating, by the base station, the hard decision block error rate of the target cluster based on the CRC hard decision result.

5. The method according to claim 4, wherein the comparing, by the base station, the correction SINR with the SINR threshold corresponding to the MCS used by the terminal device, to obtain a CRC hard decision result comprises:
   comparing, by the base station, the correction SINR with the SINR threshold corresponding to the MCS used by the terminal device, wherein:
      the CRC hard decision result is 0 if the correction SINR is greater than the SINR threshold corresponding to the MCS used by the terminal device; or
      the CRC hard decision result is 1 if the correction SINR is less than or equal to the SINR threshold corresponding to the MCS used by the terminal device.

6. The method according to claim 4, wherein the updating, by the base station, the real block error rate of the target cluster based on the CRC result comprises:
   updating, by the base station, the real block error rate of the target cluster according to the following formula:
   $IblerMeas = IblerMeas \times (1-a) + a \times CRC$, wherein IblerMeas represents the real block error rate of the target cluster, a represents a filter coefficient, and CRC represents the CRC result; and
   wherein the updating, by the base station, the hard decision block error rate of the target cluster based on the CRC hard decision result comprises:
   updating, by the base station, the hard decision block error rate of the target cluster according to the following formula:
   $IblerJudge = IblerJudge \times (1-a) + a \times JudgeCRC$, wherein IblerJudge represents the hard decision block error rate of the target cluster, and JudgeCRC represents the CRC hard decision result.

7. The method according to claim 3, wherein the updating, by the base station, the SINR error adjustment amount of the target cluster based on an updated real block error rate of the target cluster and an updated hard decision block error rate of the target cluster comprises:
   updating, by the base station, the SINR error adjustment amount of the target cluster according to the following formula:
   $SinrAdj = SinrAdj + (IblerJudge - IblerMeas) \times AdjStep$,
      wherein SinrAdj is the SINR error adjustment amount of the target cluster, IblerJudge is the updated hard decision block error rate of the target cluster, IblerMeas is the updated real block error rate of the target cluster, and AdjStep is an adjustment step size.

8. The method according to claim 2, wherein the channel quality fluctuation parameter of the cell is an SINR fluctuation variance of the cell, and wherein the updating, by the base station, a channel quality fluctuation parameter of the cell based on the channel quality information of the terminal device comprises:
   updating, by the base station, an average SINR of the cell based on the measurement SINR of the terminal device; and
   updating, by the base station, the SINR fluctuation variance of the cell according to the following formula:
   $CellSinrVar = CellSinrVar \times (1-a) + a \times (SINR - AvgSinr)^2$,
      wherein CellSinrVar is the SINR fluctuation variance of the cell, SINR is the measurement SINR of the terminal device, AvgSinr is the average SINR of the cell, and a represents a filter coefficient.

9. The method according to claim 8, wherein the determining, by the base station, an initial value of the OLLA adjustment amount of the terminal device based on an updated SINR error adjustment amount of the target cluster and an updated SINR fluctuation variance of the cell comprises:

calculating, by the base station, the initial value of the OLLA adjustment amount of the terminal device according to the following formula:

ReSinrAdj=SinrAdj−b×sqrt(CellSinrVar), wherein SinrAdj represents the SINR error adjustment amount of the target cluster, CellSinrVar is the SINR fluctuation variance of the cell, b represents a fluctuation compensation filter coefficient, and sqrt( ) represents a square root extraction operation.

10. An outer loop link adaptation adjustment apparatus, comprising a memory and at least one processor, wherein the memory is configured to store a program instruction which, when executed by the at least one processor, causes the outer loop link adaptation adjustment apparatus to perform operations comprising:

obtaining at least one type of channel quality information of a terminal device;

determining, based on the at least one type of channel quality information of the terminal device and channel quality ranges of a plurality of clusters in a cell, a target cluster to which the terminal device belongs;

updating a signal to interference plus noise ratio (SINR) error adjustment amount of the target cluster based on the at least one type of channel quality information of the terminal device;

updating a channel quality fluctuation parameter of the cell based on the at least one type of channel quality information of the terminal device;

if no initial value of an outer loop link adaptation (OLLA) adjustment amount is set for the terminal device, determining an initial value of the OLLA adjustment amount of the terminal device based on an updated SINR error adjustment amount of the target cluster and an updated channel quality fluctuation parameter of the cell; and based on the initial value of the OLLA adjustment amount of the terminal device, adjusting a measurement SINR of the terminal device, and updating the OLLA adjustment amount of the terminal device until the OLLA adjustment amount of the terminal device meets a convergence condition.

11. The apparatus according to claim 10, wherein the channel quality information of the terminal device comprises the measurement SINR of the terminal device, a reference signal received power (RSRP), a cyclic redundancy check (CRC) result, and a modulation and coding scheme (MCS) used by the terminal device.

12. The apparatus according to claim 11, wherein the at least one processor is configured to:

update a real block error rate and a hard decision block error rate of the target cluster based on the at least one type of channel quality information of the terminal device; and update the SINR error adjustment amount of the target cluster based on an updated real block error rate of the target cluster and an updated hard decision block error rate of the target cluster.

13. The apparatus according to claim 12, wherein the at least one processor is configured to:

obtain a correction SINR based on a sum of the SINR error adjustment amount of the target cluster and the measurement SINR of the terminal device;

obtain, based on the MCS used by the terminal device, an SINR threshold corresponding to the MCS used by the terminal device;

compare the correction SINR with the SINR threshold corresponding to the MCS used by the terminal device, to obtain a CRC hard decision result;

update the real block error rate of the target cluster based on the CRC result; and update the hard decision block error rate of the target cluster based on the CRC hard decision result.

14. The apparatus according to claim 13, wherein the at least one processor is configured to:

compare the correction SINR with the SINR threshold corresponding to the MCS used by the terminal device, wherein:

the CRC hard decision result is 0 if the correction SINR is greater than the SINR threshold corresponding to the MCS used by the terminal device; or the CRC hard decision result is 1 if the correction SINR is less than or equal to the SINR threshold corresponding to the MCS used by the terminal device.

15. The apparatus according to claim 13, wherein the at least one processor is configured to:

update the real block error rate of the target cluster according to the following formula:

IblerMeas=IblerMeas×(1−a)+a×CRC, wherein IblerMeas represents the real block error rate of the target cluster, a represents a filter coefficient, and CRC represents the CRC result; and update the hard decision block error rate of the target cluster according to the following formula:

IblerJudge=IblerJudge×(1−a)+a×JudgeCRC, wherein IblerJudge represents the hard decision block error rate of the target cluster, and JudgeCRC represents the CRC hard decision result.

16. The apparatus according to claim 12, wherein the at least one processor is configured to:

update the SINR error adjustment amount of the target cluster according to the following formula:

SinrAdj=SinrAdj+(IblerJudge−IblerMeas)×AdjStep, wherein SinrAdj is the SINR error adjustment amount of the target cluster, IblerJudge is the updated hard decision block error rate of the target cluster, IblerMeas is the updated real block error rate of the target cluster, and AdjStep is an adjustment step size.

17. The apparatus according to claim 11, wherein the at least one processor is configured to:

update an average SINR of the cell based on the measurement SINR of the terminal device; and update an SINR fluctuation variance of the cell according to the following formula:

CellSinrVar=CellSinrVar×(1−a)+a×(SINR−AvgSinr)^2, wherein CellSinrVar is the SINR fluctuation variance of the cell, SINR is the measurement SINR of the terminal device, AvgSinr is the average SINR of the cell, and a represents a filter coefficient.

18. The apparatus according to claim 17, wherein the at least one processor is configured to:

calculate the initial value of the OLLA adjustment amount of the terminal device according to the following formula:

ReSinrAdj=SinrAdj−b×sqrt(CellSinrVar), wherein SinrAdj represents the SINR error adjustment amount of the target cluster, CellSinrVar is the SINR fluctuation variance of the cell, b represents a fluctuation compensation filter coefficient, and sqrt( ) represents a square root extraction operation.

\* \* \* \* \*